Figures 4, 5:
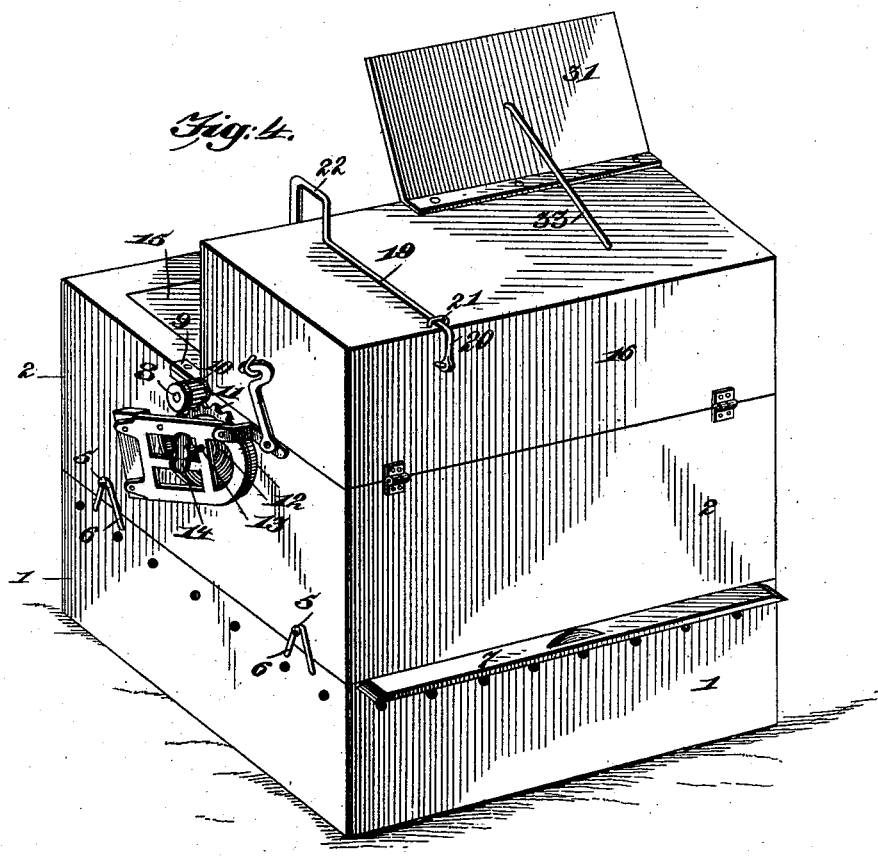

(No Model.)    2 Sheets—Sheet 1.
S. W. BUCK.
ANIMAL TRAP.
No. 595,601. Patented Dec. 14, 1897.
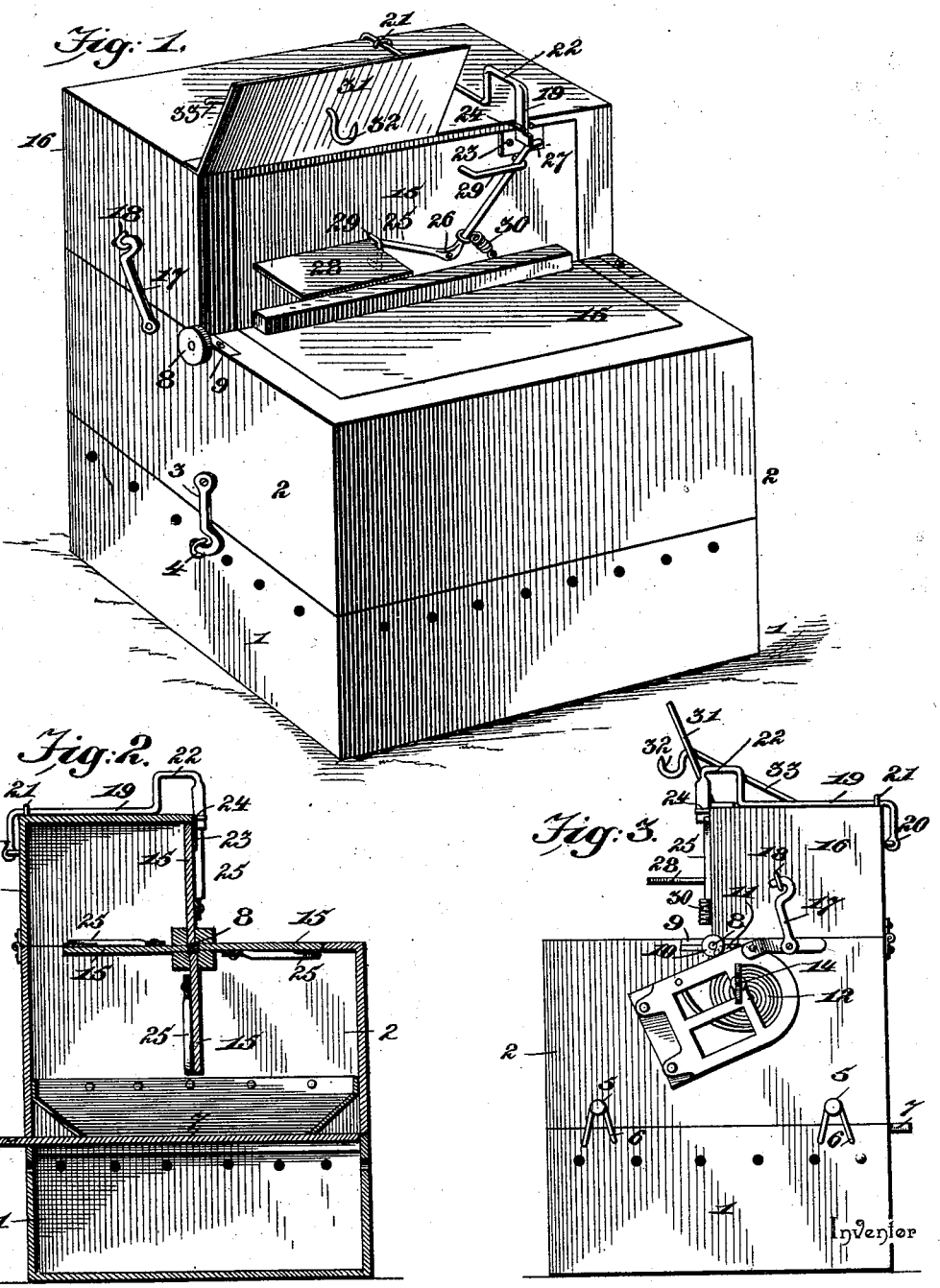
Witnesses
H. G. Dieterich
Edwin Cruse
By his Attorneys,
C. A. Snow & Co.
Inventor
Seth W. Buck (No Model.) 2 Sheets—Sheet 2.

S. W. BUCK.
ANIMAL TRAP.

No. 595,601. Patented Dec. 14, 1897.

Witnesses
H. S. Dieterich
Edwin Cruse

Inventor
Seth W. Buck
By his Attorneys,
C. A. Snow & Co.

UNITED STATES PATENT OFFICE.

SETH W. BUCK, OF HOXIE, KANSAS.

ANIMAL-TRAP.

SPECIFICATION forming part of Letters Patent No. 595,601, dated December 14, 1897.

Application filed April 14, 1897. Serial No. 632,133. (No model.)

*To all whom it may concern:*

Be it known that I, SETH W. BUCK, a citizen of the United States, residing at Hoxie, in the county of Sheridan and State of Kansas, have invented a new and useful Animal-Trap, of which the following is a specification.

This invention relates to animal-traps especially designed to catch mice or rats, its object being to provide a device of this character which will automatically reset itself every time it is tripped in catching an animal and the operation of which is controlled by a treadle to be moved by the animal to release a catch, and a spring-actuated train of gearing which operates the trap as soon as the catch is released.

The invention will be fully described hereinafter, and particularly pointed out in the claims.

In the drawings, Figure 1 is a perspective view of the trap. Fig. 2 is a vertical transverse section. Fig. 3 is an end view. Fig. 4 is a rear perspective view. Fig. 5 is a vertical longitudinal section of the lower part of the box detached.

Similar reference-numerals indicate similar parts in the several figures.

1 represents the lower and 2 the upper section of a box, which sections are detachably connected together by means of hooks and eyes 3 and 4, rigidly secured to the respective sections at one end thereof to engage each other, and a pivoted hook 5 on one section, adapted to engage an eye 6 on the other section at their other ends. The section 1 is provided with a sliding lid or cover 7, which projects beyond the rear face of the box in order that it may be grasped for the purpose of withdrawing it or inserting it in position when the two sections of the box are secured together. These sections and the lid will preferably be of sheet metal, and the lower section will be perforated, as shown.

8 represents a shaft which is journaled in suitable bearings 9, supported on the upper edges of the ends of the section 2. The shaft projects at one end beyond its bearings and carries a pinion 10, which meshes with a gear-wheel 11, which latter is actuated by a coiled spring 12 in a manner similar to an ordinary clock mechanism.

13 indicates the winding-shaft, and 14 the key, by means of which the spring may be wound up.

The shaft 8 carries four plates or wings 15, which radiate from it and are equidistant from each other. These plates may be rigidly secured to the shaft in any approved manner and are of such width and length that when two alining plates are in a horizontal plane they will practically close the upper end of the section 2. Hinged to the upper edge of the rear side of the section 2 is a casing 16, which is equal in length to the section 2 and about half its width. This casing has an open front to permit the rotation of the plates 15. The casing is held in closed position by the hooks 17, which are pivoted on the section 2 and engage eyes or headed pins 18 on the casing.

19 indicates a catch which is supported on top of the casing 16, and consists of a piece of wire having its rear end bent downwardly and pivoted to the rear face of the casing, as indicated at 20. Staples or similar devices 21 straddle the catch and are secured to the casing to prevent lateral movement of the catch. The forward end of the catch is bent or bowed upwardly, as indicated at 22, and its extreme end projects downwardly below the top wall of the casing sufficiently to engage wear-plate 23, one of which is secured to each of the wings or plates 15. The downwardly-extending part of the catch is flattened and works between guide-pins 24, secured in the edge of the top of the casing.

25 indicates an angle-lever, pivoted at its bend to the face of the wing or plate 15, as indicated at 26, and the vertical arm is bent slightly, as indicated at 27, to present a curved engaging surface to the flattened end of the catch, and the horizontal arm is provided with a treadle-plate 28, which is intended to receive the weight of the animal, as will be referred to hereinafter. Staples or other similar guiding devices 29 straddle the vertical and horizontal arms of the lever to keep it in position against the face of the wing or plate 15. A coiled spring 30 is secured at one end to the face of the wing or plate and at its other end to the vertical arm of the lever, adjacent to the pivotal point of the lever.

The normal tendency of this spring is to hold the treadle-plate 28 in its elevated position.

31 indicates a plate which is secured at its lower edge to the upper side of the casing 16, and this plate inclines upwardly and forwardly and is arranged in substantially vertical alinement with the treadle-plate 28.

32 indicates a hook which is secured to the plate 31 and is for the purpose of holding the bait. The wire of which the hook is formed extends rearwardly from the plate 31 and is secured in the casing, thereby forming a brace 33 for the plate 31. It is of course to be understood that each of the wings or plates 15 is provided with the angle-lever, treadle-plate, and spring, as heretofore described.

When the trap is to be used, the coiled spring 12 will be wound up, and this will impart to the shaft 8 a normal tendency to rotate. This rotation will, however, be prevented by the engagement of the catch 19 with the wear-plate 23 on one of the wings or plates 15, and when the trap is in this position two wings will be in vertical alinement and the other two in horizontal alinement, and the latter will close the upper end of section 2 of the box. The lid or cover 7 will be withdrawn in order that any animals that may be caught in the trap can pass through into the lower section 1 of the box. Bait will be secured on the hook 32, and it is evident that the animal will not be able to have access to the bait from any other part of the trap than its front, and the animal will naturally get on the exposed horizontal wing or plate 15 and from there get onto the treadle-plate 28 in making an effort to reach the bait. As soon as the animal's weight comes on the treadle-plate 28 it will cause the lever 25 to rock on its pivot and thereby lift the catch 19 out of engagement with the wear-plate 23, when the shaft will be free to rotate and make a quarter-revolution, thereby throwing the animal down into the box. The catch in the meantime will fall back to its normal position and engage the wear-plate of the succeeding wing or plate 15, and thereby stop the further revolution of the shaft 8.

When it is desired to destroy the animals that have been caught in the trap, the lid or cover 7 will be pushed in to close the upper end of the lower section 1 of the box and the upper section 2, and all its supports can be removed from the lower section by disengaging the hooks and eyes 3, 4, 5, and 6, leaving the animals confined in the lower section 1.

The plates or wings 15 and the casing may be of any desired material, and while I prefer to make the sections of the box of metal it is to be understood that I do not restrict my invention to the use of such material, and it is also to be understood that changes in the form, proportion, and minor details of construction may be resorted to without departing from the spirit or sacrificing any of the advantages of this invention.

Having thus described my invention, what I claim is—

1. In an animal-trap, an open-top box, an open-front casing supported on the upper end of the box to close substantially one-half of its open top, a shaft journaled to rotate in said box and having a series of radiating wings adapted to successively close the open front of said casing and also the open top of said box, a catch pivoted on the casing to engage the wings, and a treadle pivoted on the wing and having an arm to engage said catch, combined with an overhanging plate secured to said casing above the treadles, and a bait-hook supported by said plate directly over the treadle, substantially as described.

2. In an animal-trap, the combination of a box composed of two superposed sections detachably connected together, a sliding cover for the lower section adapted to be withdrawn when the sections are secured together, and means to throw the animals into the box, substantially as described.

3. In an animal-trap, the combination of a series of plates radiating from a rotative shaft at opposite points, a catch pivoted on the trap to engage the plates and prevent the shaft from turning, an angle-lever pivoted on each of said plates, the vertical arms of which are adapted to engage the catch to lift it out of engagement with the plates, a treadle-plate on the horizontal arm of the lever, and a spring connecting the vertical arm of the plate and normally holding the treadle-plate elevated, substantially as described.

In testimony that I claim the foregoing as my own I have hereto affixed my signature in the presence of two witnesses.

SETH W. BUCK.

Witnesses:
 FRANKLIN LEE,
 EDWARD T. CRUM.